(12) United States Patent
Grasso et al.

(10) Patent No.: US 7,240,055 B2
(45) Date of Patent: Jul. 3, 2007

(54) METHOD AND SYSTEM FOR EXPERTISE MAPPING BASED ON USER ACTIVITY IN RECOMMENDER SYSTEMS

(75) Inventors: Antonietta Grasso, Grenoble (FR); Andre Bergholz, Grenoble (FR)

(73) Assignee: Xerox Corporation, Stamford, CT (US)

( * ) Notice: Subject to any disclaimer, the term of this patent is extended or adjusted under 35 U.S.C. 154(b) by 481 days.

(21) Appl. No.: 10/733,584

(22) Filed: Dec. 11, 2003

(65) Prior Publication Data

US 2005/0131897 A1    Jun. 16, 2005

(51) Int. Cl.
G06F 17/30 (2006.01)
(52) U.S. Cl. .......................................... 707/5
(58) Field of Classification Search ............... 707/4, 707/102, 3, 5, 10
See application file for complete search history.

(56) References Cited

U.S. PATENT DOCUMENTS 6,321,179 B1   11/2001   Glance et al. ............... 702/189
6,327,590 B1   12/2001   Chidlovskii et al. ........... 707/5

OTHER PUBLICATIONS

Mattox et al., Proceedings of the HCI International '99 (the 8th International Conference on Human-Computer Interaction) on Human-Computer Interaction: Communication, Cooperation, and Application Design, vol. 2, pp. 303-307 (renumbered as 1-11 in the provided document), 1999.*

Maybury et al., International Journal of Human-Computer Interaction, vol. 14 (2), pp. 199-217, Jun. 2002.*

Chang et al., Learning to Create Customized Authority Lists, Proceedings of the Seventh International Conference on Machine Learning, pp. 127-134, 2000.*

J.M. Kleinberg, "Authoritative Sources in a Hyperlinked Environment", IBM Research Report RJ 10076, May 1997, pp. 1-33.

* cited by examiner

Primary Examiner—Cheyne D Ly
(74) Attorney, Agent, or Firm—Jeannette Walder

(57) ABSTRACT

The system and method analyzes activities of users in a recommender system to identify experts. Two types of experts may be identified: authoritative experts and hub experts. An authoritative expert is a user who creates items or documents in a given field that are acted upon by a large number of users within a community who are well connected in the given field. A hub expert is a user who is aware of important items or documents within a given field and uses, works or acts upon items or documents produced by authoritative experts. The system and method also identifies authoritative items (e.g., documents). An authoritative item or document is one which has been acted upon by a large number of users within a community who are well connected in the given field (i.e., hub experts).

15 Claims, 1 Drawing Sheet

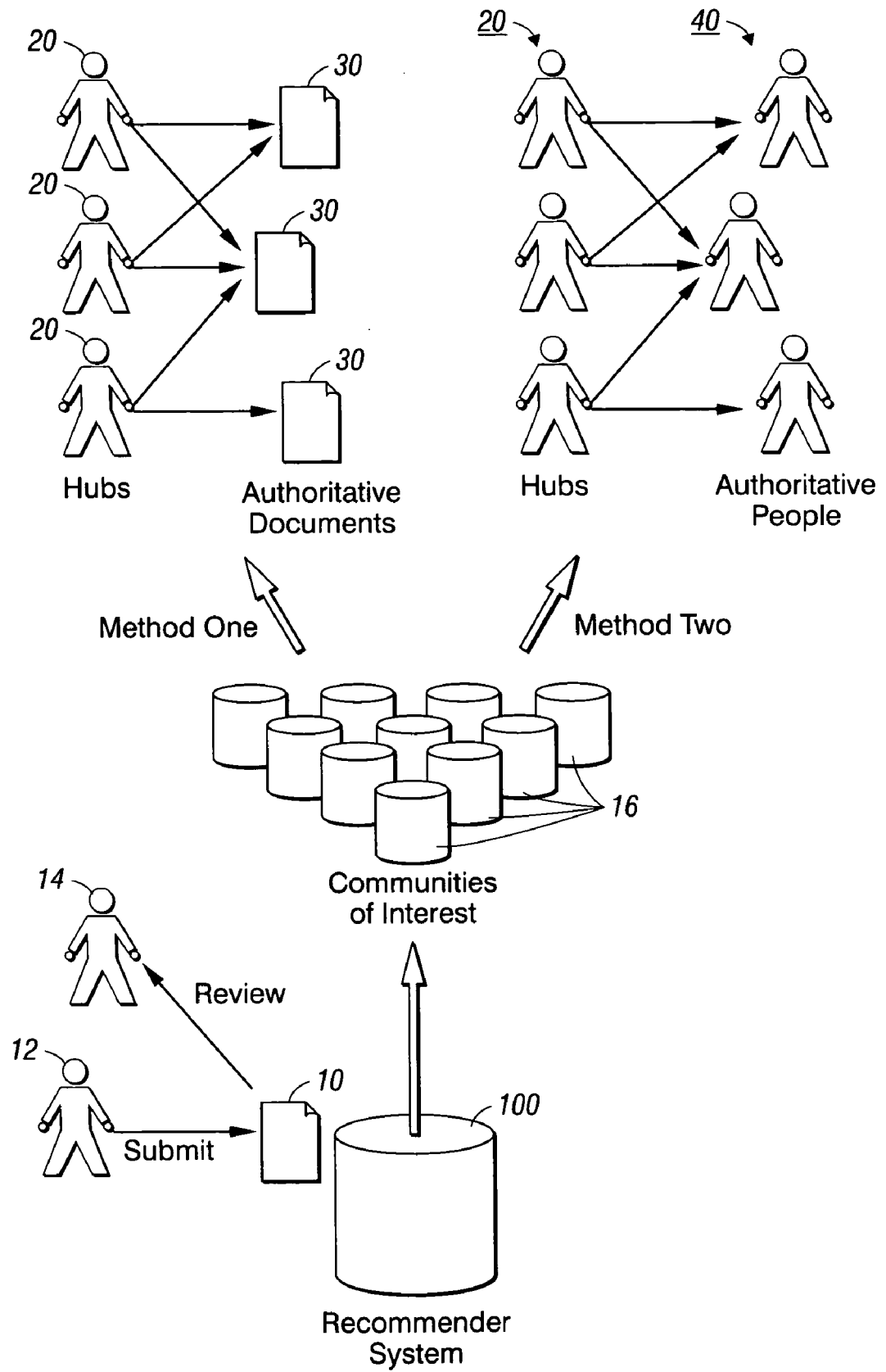

METHOD AND SYSTEM FOR EXPERTISE MAPPING BASED ON USER ACTIVITY IN RECOMMENDER SYSTEMS

CROSS-REFERENCE TO RELATED APPLICATIONS

This applications is related to U.S. Pat. No. 6,327,590 to Boris Chidlovskii, et al., for "System And Method For Collaborative Ranking Of Search Results Employing User And Group Profiles Derived From Document Collection Content Analysis" and to U.S. Pat. No. 6,321,179 to Natalie S. Glance, et al., for "System And Method For Using Noisy Collaborative Filtering To Rank And Present Items", the contents of which are incorporated herein by reference.

FIELD OF THE INVENTION

This invention relates generally to recommender systems, and more particularly, to a recommender system, which employs expertise mapping based on user activity.

BACKGROUND OF THE INVENTION

Recommender systems typically provide recommendations to users based on a user's defined preferences and interests. Early recommender systems, for example Firefly and GroupLens, provided personalized recommendations of movies, restaurants, newsgroup articles and music to an Internet audience. These early systems generally used statistical algorithms to perform what is called in the literature automated collaborative filtering (ACF). Basically, the algorithms learn to identify groups of people with similar preferences within given domains of interest or genres. As a result, recommender systems are able to provide personalized recommendations, predicting how much an item is likely to appeal to a user based on how others evaluated the item. The more items a user evaluates, the better the system will be able to personalize its recommendations. Recommendations usually consist of numerical ratings input manually by users, but they can also be deduced from user behavior (e.g., time spent reading a document, actions such as printing, saving or deleting a document). A premise of recommender systems is that a user is going to prefer an item that is similar to other items chosen by the user and by other users.

An emerging category of product functionality is skill mining. Skill mining lets a system automatically identify users' skills and expertise based on the observation of the documents they produce (e.g., reports, E-mail or discussion database postings). This information is used to augment the system's information retrieval and knowledge management capabilities by causing it to fulfill a user's request for information with pointers to knowledgeable colleagues in addition to document references. Current systems for skill mining have a major drawback; they are based on individual production of information, without collective means for measuring how "authoritative" a person is in a field. However, several algorithms have been proposed in the recent years attempting to measure the "authority" level of a page or of an author by elaborating on the connections among documents, typically either hyperlinks or co-citations. This category of algorithms is based on the observation that the more a resource is "used" or referred to, the more authoritative it is. An example of such category of algorithms is HITS (Kleinberg, J. M., "Authoritative Sources in a Hyperlinked Environment", IBM Research Report RJ 10076, May 1997, pp. 1–33).

Knowledge Pump, a Xerox system, provides community-based recommendations by initially allowing users to identify their interests and "experts" in the areas of those interests. Knowledge Pump is then able to push relevant information to the users based on those preferences. This is accomplished by monitoring network traffic to create profiles of the users, including their interests and communities of practice, thus refining the community specifications. For many users, items recommended by experts are given greater weight than items recommended by non-experts. However, identifying experts within a community of interest is not always straightforward. What is needed is a method for identifying experts or authorities in a recommender system.

SUMMARY OF THE INVENTION

The system and method of the invention analyzes activities of users in a recommender system to identify experts. Two types of experts may be identified: authoritative experts and hub experts. An authoritative experts is a user who creates items or documents in a given field that are acted upon by a large number of users within a community who are well connected in the given field. A hub expert is a user who is aware of important items or documents within a given field and uses, works or acts upon items or documents produced by authoritative experts. The system and method also identifies authoritative items (e.g., documents). An authoritative item or document is one which has been acted upon by a large number of users within a community who are well connected in the given field (i.e., hub experts).

A method for identifying an expert within a community of users in a recommender system, according to one aspect of the invention, includes identifying items in a particular field provided by users within the community. For each identified item, the method determines which users within the community have acted upon the identified item; then it determines which of the users who have acted upon the identified document are aware of other relevant items in the particular field. These users are defined as hub experts in the particular field. The method then determines which identified items have been acted upon by a predetermined number of hub experts; and defines those items as authoritative items. A list of hub experts may then be associated with the authoritative documents.

Users may act upon items in many different ways. For example, acting on an item may include reading the item, reviewing the item, commenting on the item or recommending the item. Recommending an item, for example, may include submitting a numerical rating or submitting a numerical rating and a comment.

A method for identifying an expert within a community of users in a recommender system, according to another aspect of the invention, includes identifying items in a particular field created by users within the community. For each identified item, the method determines which users within the community have acted upon the identified item, then it determines which of the users who have acted upon the identified document are aware of other relevant items in the particular field; and defines those users as hub experts in the particular field. The method then determines which users creating identified items have had their identified items acted upon by a predetermined number of hub experts; and defines those users as authoritative experts. A list of hub experts may be associated with the authoritative experts.

The method and system presents a model of interest/expertise of a group of users (possibly distributed across several organizational units) where activities of users are used to derive a model of the interest and expertise of each user in a certain field. The HITS algorithm may be applied both to users and items (or documents) in a recommender system. The method and system can distinguish between authoritative experts and hub experts; the former being the users who produce relevant documents that get "acted upon" by many other users who are well connected in a certain field (who are aware of relevant information, even if they do not directly produce content in a certain field). The method may be used to associate a list of "hub" experts, i.e., a list of people who can be considered aware of relevant knowledge in a field, even if their active contribution is less that the one of authoritative experts, to the documents of a certain domain reviewed by the people in an organization. The method may also be used to associate a list of authoritative experts, i.e., a list of people who can be considered experts in a particular field, to the documents of a certain domain reviewed by the people in an organization.

The system and method is based on an equivalence of the act of explicitly referring to a document to the level of activity that is carried on a document (roughly corresponding to an implicit link). In fact, it can be imagined that a report written on a certain topic and "acted upon" by a large number of persons who are very authoritative (expert) in the field of the document is a good indication of the value of the document. Additionally, according to their behavior, the system and method can distinguish between authoritative experts and hub experts, the former being the people who produce relevant documents that get "acted upon" by many other people who are well connected in a certain field (who are aware of relevant information, even if they do not directly produce content in a certain field). The definition is a circular one, a good hub expert is a person aware of and using work (documents) done by very authoritative experts and very authoritative experts are the ones whose work (documents) is used in a substantial way by others.

The system and method also takes into account that a person, unlike a document, is inherently multi-topic. To support this aspect the method may be applied to clusters of documents belonging to the same domain or field (e.g., "ubiquitous computing", "wireless technology" etc.). By applying the proposed method on top of a cluster it is possible to see who are the contributors to the field, both in terms of authoritative experts and in terms of hub experts. The way people can "work" on documents can vary. In the case of a recommender system, the method considers how the activities of reviewing and commenting documents can be used to derive expertise measures.

BRIEF DESCRIPTION OF THE FIGURE

FIG. 1 is a block diagram of a system functional architecture for mining expertise from review of documents submitted to a recommender system.

DETAILED DESCRIPTION OF THE EMBODIMENTS

Recommender systems are useful for sharing knowledge in an organization. Recommender systems provide beneficial features, such as, mechanisms to annotate information and quickly share relevancy evaluation within a community and support for both focused and serendipitous information discovery, enhancing the social network. The system and method of the invention can be used with any recommender system. For exemplary purposes only, the following description is made with reference to a specific recommender system, Knowledge Pump. Knowledge Pump (KP) is a web-based shared bookmark and recommender system that uses collaborative filtering to provide recommendations tailored to each user. It allows users to submit recommendations of URLs, local files (via upload), or text. A recommendation consists of a rating and, optionally, a comment, along with the user's classification of the item into one or more communities. In turn, the Knowledge Pump calculates a personalized set of recommendations for a user for each community to which s/he belongs. Each recommended item consists of a link to the item, the predicted score for the user, a list of the names of the users who reviewed it and links to their comments. These last components, reviewer names and comments, are what bring out the potential of a workplace recommender system. A system like Knowledge Pump allows users to track who is active and knowledgeable in their community as well as in turn providing them ways to build their own reputations. Furthermore, the comments around a recommended item enhance the value of that item (in a sense, turning information into knowledge).

The user behavior in a recommender system can be categorized roughly in three categories. (1) Users who actively submit and introduce new information in the system; typically these users know well a certain domain and are aware of relevant work going on in it. These people are characterized by an active attitude to the system. (2) Users who benefit from the recommendations, are able to provide their own judgment, but are not so aware of new information. In a way these users are learning about a topic. These people are characterized by a semi-active attitude to the system. Casual users also fall into this category. (3) Users who benefit from the recommendations, but typically do not introduce new information or comments and feedback on the existing one. These people are characterized by a passive attitude to the system.

Being very active or semi-active, does not automatically mean that a person is an expert in a field. People could submit a large number of recommendations, which are of no value at all. This is a phenomenon that can sometimes be observed in public forums, where there are people submitting a lot, but with little value associated. What makes recommendations valuable is their usefulness to the other users in the system. With the methods described herein, not only are people who produce information in a field (which is already a rough measure of their expertise in the area) captured, but also the methods detect if the produced information is used by other people in the system. Moreover, when the definition is recursive, the method reinforces the quality value of the involved party: a piece of information is submitted by a person of higher expertise if it is used by people who can distinguish meaningful information and vice versa.

The HITS algorithm may be used in the method of the invention. The HITS algorithm introduces the idea of hubs and authorities. Hubs are "items" that link to high quality "items"; authorities are those high quality "items". Originally, HITS is intended to work on the Web; an example for a hub would be a directory listing at yahoo.com and an example for an authority would be cnn.com. HITS works on a directed graph where the nodes represent Web pages. A connectivity matrix M specifies the relationship among the nodes: element $M_{ij}$ is non-zero if and only if there is an arc from node i to node j. For a given node i let $a_i$ and $h_i$ be the "authority" and "hub" value, respectively. These values are real numbers greater than or equal to zero and have the following interpretation: a large hub value indicates that the item (originally, the Web page) links to many items that are authorities; a large authority value indicates that an item (originally, a Web page) is linked to by many good hubs. This leads to two equations:

$$a_i = \sum_j M_{ji} h_j, \quad h_i = \sum_j M_{ij} a_j$$

whose solutions are the principal eigenvectors of M'M_ and MM', respectively. By defining vectors a=[$a_1, a_2, \ldots a_n$]' and h=[$h_1, h_2, \ldots h_n$]', it is possible to express the equation in the following form:

a=M'h=M'Ma, h=Ma=MM'h.

It is possible (and more efficient) to pursue an iterative solution beginning with arbitrary values (usually the unit vector) for a and h; a and h are proved to converge to the principal eigenvector of MM'.

The HITS algorithm may be applied to a recommender system to determine which users may be hub experts and which users may be authoritative experts. FIG. 1 is a block diagram of a system functional architecture for mining expertise from review of documents submitted to a recommender system. Users consume documents by giving ratings. The more a document is consumed by people who value interesting submissions the more valuable the document. The more a person consumes valuable documents, the more they are aware (hub) of relevant documents in the field.

Two methods for computing a model of user expertise by analyzing their activities in a recommender system will described. These methods may employ a circular definition of the notion of "authoritativeness" and "hub user" and on the use of the HITS algorithm, with two variants of "authoritative user/expert" "hub user/expert" and "authoritative document"/"hub user/document" notions and discusses for each how to build a directed graph out of the observation of user activities in each community of a recommender system so as to apply the HITS algorithm. The problem of "expertise mining" is an important one in large organizations. The proposed method only requires the access to the usage data of a recommender system.

Referring to FIG. 1, a recommender system 100 has a memory for storing items 10 submitted by users 12. Items 10 may be provided to other users 14 who subscribe to the recommender system 100. Users 14 review the submitted items 10 and provide a rating or recommendation. Recommender system 100 may include a single community of interest 16 or multiple communities of interest 16. A community of interest represents a group of items pertaining to a particular subject matter of interest to some of the users to the system. For example, recommender system 16 may include a community of interest to the category "digital libraries" and another one to "WWW infrastructure".

In a first method, only users 20 can be hubs and only documents 30 can be authorities. The first method determines which users qualify as hub experts and which items (documents) submitted to the recommender system 100 qualify as authoritative documents. In the first method, the graph employed for the HITS algorithm is an undirected bipartite graph (as shown in FIG. 1). The nodes represent the users 20 and documents 30, while edges (arrow running from node 20 to node 30) indicate a rating activity. User nodes only have a hub value and document nodes only have an authority value. There is no distinction made among the types of activities the user makes on the document (i.e., whether he suggests/submits the document or whether he rates a document submitted by someone else). An intuitive interpretation of the hub value given to the people is the expertise of those people in the subject measured by their activities on relevant documents.

The connectivity matrix M is constructed by setting $M_{ij}$ to 1 if user i performed an activity on document j and 0 otherwise. The resulting matrix is not quadratic as in the original algorithm, because the total number of users most likely differs from the total number of documents. The equations a=M'h=M'Ma, h=Ma=MM'h.

work as in the original HITS algorithm. The resulting vectors a and h represent the authority values for the documents and the hub values for the users.

A second method determines which users qualify as hub experts and which users who submit documents to the recommender system 100 qualify as authoritative experts. Experts are those people who submit information that is reviewed by many people capable of distinguishing interesting submissions. People who submit documents that are not taken into account by others are ranked as having less expertise. In this method we make a distinction among the activities that a user performs on a document. Users who submit documents to the system play a different role than users who rate them. Here, both the authority and hub values are given to users. The graph on which the HITS algorithm is applied is constructed as follows. The nodes represent the users of the recommender system 100. An arc is created between two users B and A when a user A publishes a document reviewed by user B. Intuitively, this link means that B acknowledges the relevance of the document submitted by A. This is equivalent to the link from a Web page to another Web page, as in the original HITS algorithm. This second method estimates the authority level of A (users 40) as the relevance of the documents he submits and the hub level of B (users 20) as his ability to recognize documents published by authoritative people. Once the graph is constructed the original HITS algorithm as described above can be applied to it. The result is a list of users having published a document, sorted by authority value, and a list of users having reviewed a document, sorted by hub value. The ranking of users depends on different criteria: their activity level (publication or reviews) and level of "trust" people have in them (i.e., users may know that documents published by the user A are, in general, interesting documents).

Instead of just adding one for each link between users and documents/users and users it may be desirable to incorporate the actual rating of the user. This may be accomplished in several ways. For method one, set $M_{ij}$ not to 1, but to max-|rij-Rj|. Here, max denotes the maximal rating possible (5 in Knowledge Pump for example), rij denotes the rating of user i for document j and Rj denotes the average rating of document j so far. This variation reflects the fact is that a user are likely to be of higher expertise if that user agrees with the average rating. For method two, in the construction of the graph an arc between users B and A is only added if the ratings of A and B for the current document are within the same range, e.g., do not differ by more than a predetermined amount.

The presented methods could be applied to any recommender system, enlarging its range of functionality to include expert detection, average expert rating for documents, incorporation of expert information into the recommendation formulas, etc.

The methods described herein have been implemented and tested on an existing installation of Knowledge Pump software using real data coming from the KP installation at Xerox Research Centre Europe in Grenoble, France. The implementation for method one consists of a Java package, which accesses the KP database through JDBC. In particular, the tables for the users, documents, communities and reviews were used. The implementation is done in an iterative manner: a default of 25 iterations are run to obtain the final result. One example of a result for the "digital libraries" community: the expert is "Chevalier" with a hub value of 2.29, while the most active user "Chidlovskii" ends up in fourth place with a hub value of 1.87. In the "WWW infrastructure" community "Chevalier" is the expert user with a hub value of 14.38, way ahead of everybody else, whereas the most active user "Meunier" has a hub value of only 0.59 which places him in the lower section (values of less than 1).

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for identifying hub experts within a community of users and authoritative documents in a recommender system, comprising:
    identifying documents in a particular field provided by users within the community;
    for each identified document:
        determining which users within the community have acted upon the identified document;
        determining which of the users who have acted upon the identified document are aware of other relevant documents in the particular field and have not directly produced documents in the particular field; and
        defining those users as hub experts in the particular field;
    determining which identified documents have been acted upon by a predetermined number of hub experts;
    defining those documents as authoritative documents; and
    associating the hub experts with the authoritative documents;
    wherein the steps of defining the hub experts and authoritative documents comprise:
        defining a connectivity matrix M, wherein element $M_{ij}$ is non-zero if and only if there is an arc from node i to node j;
        wherein for a given node i, $a_i$ is an authority value and $h_i$ is a hub value, such that:

$$a_i = \sum_j M_{ji} h_j \text{ and } h_i = \sum_j M_{ij} a_j$$

whose solutions are the principal eigenvectors of M'M and MM', respectively; and
defining vectors $a=[a_1, a_2, \ldots a_n]'$ and $h=[h_1, h_2, \ldots h_n]'$, such that $a=M'h=M'Ma$, and $h=Ma=MM'h$
wherein node I represents an authoritative document and node j represents a hub expert; and wherein a represents an authority value for an authoritative document and wherein h represents a hub value for a hub expert;
generating a list of hub experts associated with the authoritative documents.

2. The method of claim 1, further comprising associating names of the hub experts with the authoritative documents.

3. The method of claim 1, acting upon the document comprises one of reading the document, reviewing the document, commenting on the document and recommending the document.

4. The method of claim 3, wherein recommending the document comprises submitting a numerical rating.

5. The method of claim 3, wherein recommending the document comprises a submitting a numerical rating and a comment.

6. The method of claim 1, wherein $M_{ij}$ is 1 if and only if there is an arc from node i to node j.

7. The method of claim 1, wherein $M_{ij}$ is max-|rij-Rj|, where max denotes the maximal rating possible, rij denotes the rating of user i for document j and Rj denotes the average rating of document j so far.

8. A method for identifying hub experts and authoritative experts within a community of users in a recommender system, comprising:
    identifying documents in a particular field created by users within the community;
    for each identified document:
        determining which users within the community have acted upon the identified document;
        determining which of the users who have acted upon the identified document are aware of other relevant documents in the particular field and have not directly produced documents in the particular field; and
        defining those users as hub experts in the particular field;
    determining which users creating identified documents have had their identified documents acted upon by a predetermined number of hub experts;
    defining those users as authoritative experts; and
    associating the hub experts with the authoritative experts;
    wherein the steps of defining hub experts and authoritative experts comprise:
        defining a connectivity matrix M, wherein element $M_{ij}$ is non-zero if and only if there is an arc from node i to node j;
        wherein for a given node i, $a_i$ is an "authority" value and $h_i$ is a "hub" value, such that:

$$a_i = \sum_j M_{ji} h_j \text{ and } h_i = \sum_j M_{ij} a_j$$

whose solutions are the principal eigenvectors of M'M_ and MM', respectively; and defining vectors a=[$a_1, a_2, \ldots a_n$]' and h=[$h_1, h_2, \ldots h_n$]' such that a=M'h=M'Ma, and h=Ma=MM'h wherein node I represents an authoritative expert and node j represents a hub expert; and wherein a represents an authority value for an authoritative expert and wherein h represents a hub value for a hub expert;

generating a list of hub experts associated with the authoritative experts.

9. The method of claim 8, further comprising associating names of the hub experts with the authoritative experts.

10. The method of claim 8, acting upon an document comprises one of reading the document, reviewing the document, commenting on the document and recommending the documents.

11. The method of claim 10, wherein recommending the document comprises submitting a numerical rating.

12. The method of claim 10, wherein recommending the document comprises a submitting a numerical rating and a comment.

13. The method of claim 8, wherein an arc between users B and A is only added if the ratings of A and B for the current document are within the same range, wherein the ratings do not differ by a predetermined value.

14. A recommender system for recommending documents to users in a community of interest, comprising:

a memory storing: documents provided by users in a particular field within the community; and for each identified document: ratings for the document made by other users in the system and a list of any hub expert users associated with the document; and a processor identifying documents in the particular field provided by users within the community; each identified document: for determining which users within the community have acted upon the identified document; determining which of the users who have acted upon the identified document are aware of other relevant documents in the particular field and have not directly produced documents in the particular field; and defining those users as hub experts in the particular field; determining which identified items have been acted upon by a predetermined number of hub experts; and defining those documents as authoritative documents and associating hub experts with authoritative documents;

the processor for defining a connectivity matrix M, wherein element $M_{ij}$ is non-zero if and only if there is an arc from node i to node j; wherein for a given node i, $a_i$ is an authority value and $h_i$ is a hub value, such that:

$$a_i = \sum_j M_{ji} h_j \text{ and } h_i = \sum_j M_{ij} a_j$$

whose solutions are the principal eigenvectors of M'M_ and MM', respectively; and defining vectors a=[$a_1, a_2, \ldots a_n$]' and h=[$h_1, h_2, \ldots h_n$]' such that a=M'h=M'Ma, and h=Ma=MM'h wherein node I represents an authoritative document and node j represents a hub expert; and wherein a represents an authority value for an authoritative document and wherein h represents a hub value for a hub expert;

processor generating a list of hub experts associated with the authoritative documents.

15. A recommender system for identifying an expert within a community of users in a recommender system, comprising:

a memory storing: documents provided by users in a particular field within the community; and for each identified document: ratings for the document made by other users in the system; a list of authoritative experts and a list of any hub expert users associated with the authoritative experts; and a processor identifying documents in a particular field created by users within the community; each identified document: for determining which users within the community have acted upon the identified document; determining which of the users who have acted upon the identified document are aware of other relevant documents in the particular field and have not directly produced documents in the particular field; and for defining those users as hub experts in the particular field; determining which users creating identified documents have had their identified documents acted upon by a predetermined number of hub experts; and for defining those users as authoritative experts; and for associating hub experts with authoritative experts;

the processor defining a connectivity matrix M, wherein element $M_{ij}$ is non-zero if and only if there is an arc from node i to node j; wherein for a given node i, $a_i$ is an authority value and $h_i$ is a hub value, such that:

$$a_i = \sum_j M_{ji} h_j \text{ and } h_i = \sum_j M_{ij} a_j$$

whose solutions are the principal eigenvectors of M'M$_{13}$ and MM', respectively; and defining vectors a=[$a_1, a_2, \ldots a_n$]' and h=[$h_1, h_2, \ldots h_n$]' such that a=M'h=M'Ma, and h=Ma=MM'h wherein node I represents an authoritative expert and node j represents a hub expert; and wherein a represents an authority value for an authoritative expert and wherein h represents a hub value for a hub expert;

generating a list of hub experts associated with the authoritative experts.

* * * * *